Figure 1:
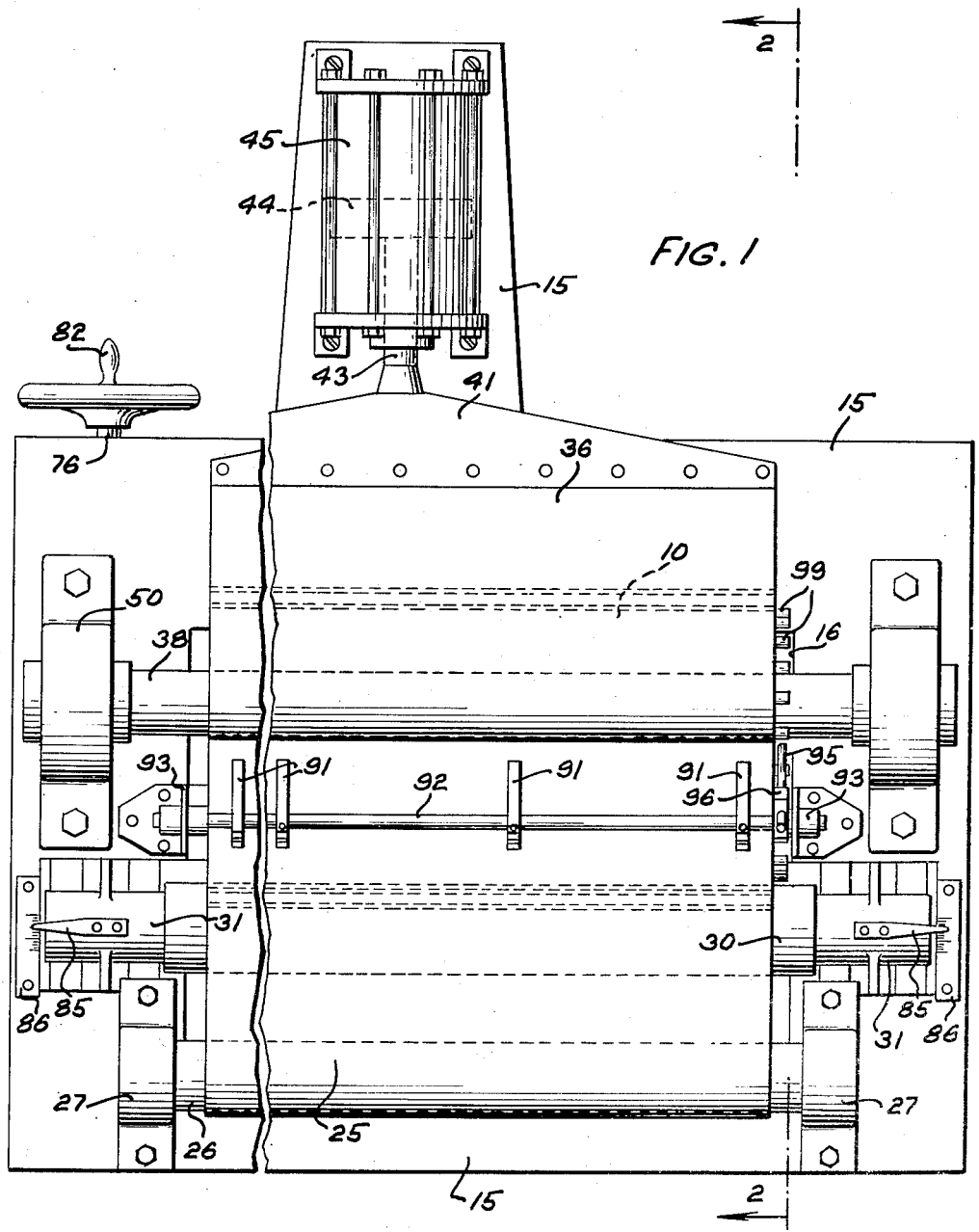

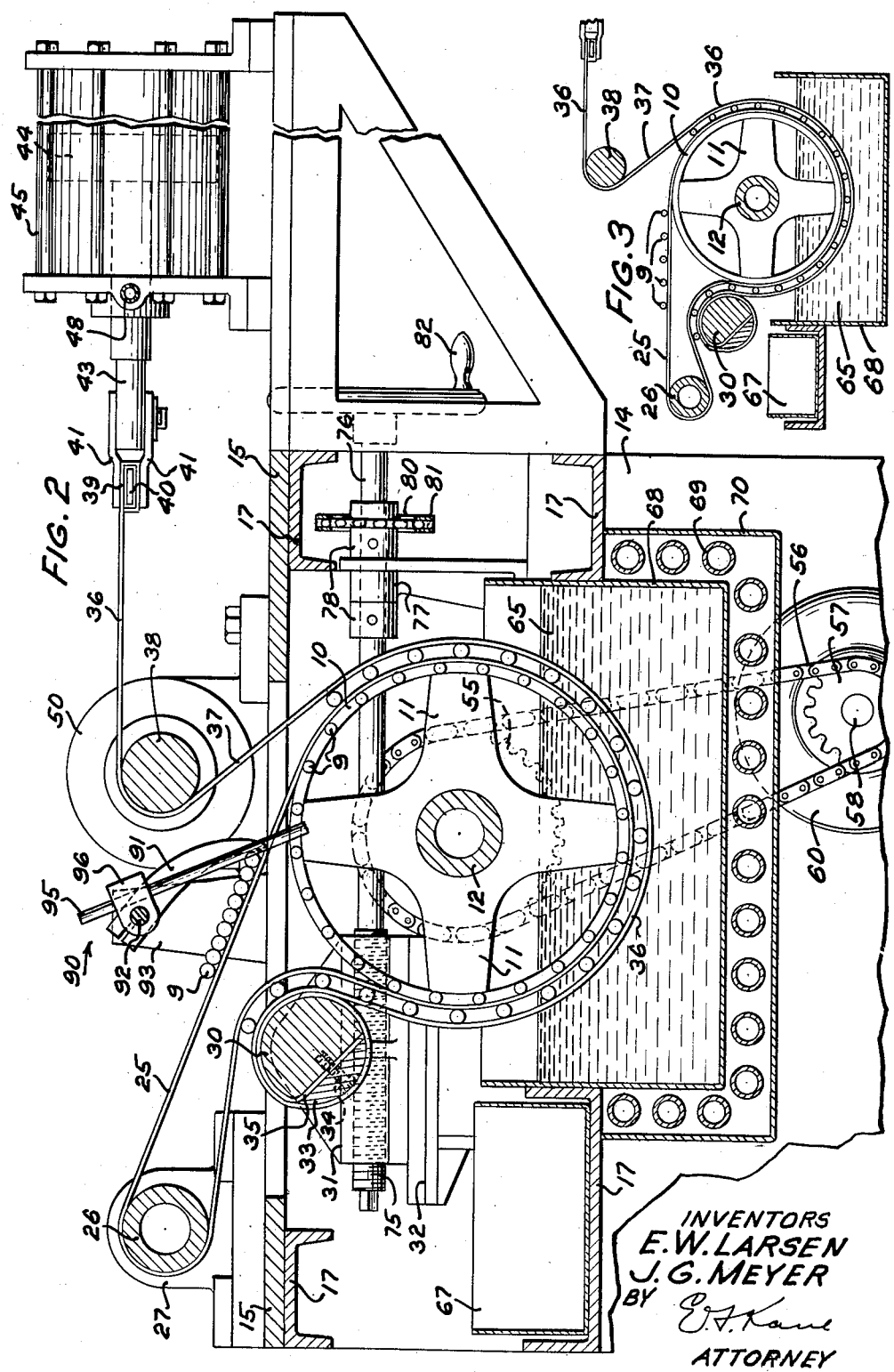

Patented Jan. 15, 1952

2,582,491

UNITED STATES PATENT OFFICE 2,582,491

APPARATUS FOR STRAIGHTENING ROUND RODS OR TUBES OF PLASTIC MATERIAL

Einer W. Larsen, Elmhurst, and John G. Meyer, Cicero, Ill., assignors to Western Electric Company, Incorporated, New York, N. Y., a corporation of New York Application April 21, 1948, Serial No. 22,284

17 Claims. (Cl. 18—9)

1

This invention relates to straightening apparatus and more particularly to apparatus for straightening round rods or tubes of plastic material while they are still warm and flexible and cooling them to a state of hardness.

Because plastic rods, when hot, are flexible, they are usually irregularly shaped when they are taken from a curing oven, and it is necessary to straighten them before they cool to a non-flexible condition. One way of straightening the hard rubber rods heretofore has been to position a plurality of them, while still warm and flexible, upon a flat table and place a flat plate upon them and move it relative to the table to roll the rods straight between the table and the plate until the rods cool to a state of stiffness.

It is an object of the present invention to provide an effective and efficient machine for straightening plastic rods or tubes.

In one embodiment of the apparatus, there is provided a driven drum having a belt substantially encircling its periphery and extending laterally therefrom around an idler roller to provide a loading surface where the rods or tubes may be loaded thereon, and a stationary belt encircling a portion of the drum and having one end fixed to a support and the other end connected to an air cylinder for tensioning the belt, the warm and flexible rods or tubes placed on the movable belt being fed thereby into engagement with the stationary belt and caused to be rolled between the inner surface of the stationary belt and the outer surface of the moving belt around a substantial portion of the drum and straightened thereby. The lower portion of the drum extends into a coolant so that the rods, as they are rolled around the drum, are cooled in their straightened condition and subsequently ejected from the machine.

The invention will be more fully understood by reference to the following detailed description and the accompanying drawings illustrating several embodiments thereof in which Fig. 1 is a plan view of the apparatus with a portion thereof broken away;

Fig. 2 is a vertical longitudinal section of the apparatus taken on the line 2—2 of Fig. 1; and Fig. 3 is a somewhat diagrammatic longitudinal sectional view of a modified embodiment of the apparatus.

Referring now to the several views of the drawings, wherein the same parts are designated with like reference numerals, the apparatus comprises a cylindrical drum 10 connected by a plurality of spider supports 11 to a shaft 12. The shaft 12 is journalled in suitable bearings mounted

2 in the end frames 14, which may be supported on the floor or any suitable base structure. A plate or top 15 provided with a rectangular aperture 16, is secured to the top of the end frames 14 and to the upper ones of a plurality of channel-shaped cross ties or frame members 17, which, together with the top 15, secure the end frames 14 together. An endless belt 25 encircles and engages the major portion of the periphery of the drum 10 and extends laterally therefrom to encircle an idler roller 26, which is journalled in bearings 27—27 mounted on the plate 15. The intermediate portion of the lower course of the belt 25 passes over a cylindrical belt tensioning member 30 secured at its ends in blocks 31—31, which are mounted on supports 32 extending inwardly from the end frame members 14.

The cylindrical member 30 has a removable portion 33, which is secured to the member 30 by a plurality of screws 34 to clamp one end 35 of a flexible belt or blanket 36 encircling the major portion of the drum 10. A straight portion 37 of the belt 36 extends obliquely upwardly from the drum and, together with the belt 25, forms a pair of converging surfaces for receiving the rods or tubes 9 fed thereinto. The belt 36 passes around an idler roller 38 and its other end 39 is wrapped around a bar 40 and is secured therewith to a pair of plates 41—41, which are pivotally connected to a rod 43 of a piston 44. The piston 44 is mounted for horizontal movement within a cylinder 45, which is supported on a laterally extending portion of the top plate 15.

Air passing into the forward end of the cylinder through a conduit 48 and under control of pressure regulating valves (not shown) urges the piston 44 rearwardly, which applies a predetermined tensioning force to the belt 36 and causes all portions of the belt 36 encircling the drum 10 to be moved inwardly towards the drum. The idler roller 38 is supported at its ends in bearing members 50 mounted on the top plate 15 of the machine.

The drum 10 is power driven through a sprocket 55, mounted on a shaft 12, and a chain 56 connecting the sprocket 55 with a driving sprocket 57 mounted on a drive shaft 58 of a gear reducer and motor drive unit 60 (Fig. 2).

The rods or tubes 9 to be straightened are placed on the upper run of the belt 25 and are fed one at a time by the belt 25 into engagement with the stationary belt 37, which presses the rods tightly against the outer surface of the belt 25 on the drum 10, and as the drum rotates, the rods are caused to roll between the stationary and the movable belt and about the drum. The rolling action of the rod between the stationary and the movable belt straightens the rod and, as it is carried downwardly about the drum in its rolling movement, it is immersed in a liquid coolant 65, after which it is carried up by the rotating belt around the idler member 30 and drops into a receptacle 67 supported below the member 30 on one of the cross frame members 17 (Fig. 2).

The coolant 65 is contained in a pan or container 68, suitably secured between the lower channel cross frame members 17, and comprises a solution of soapy water, which lubricates the rotary belt and the portion of the stationary belt and serves to prevent excessive friction between them when no rods are in the machine and there is a relative movement between the belts. To aid in maintaining the coolant at a low temperature, the lower portion of the container 68 may be surrounded with coils 69 of a refrigerating unit, through which the refrigerant may circulate, and around which coils a housing 70 may be provided.

The apparatus is designed to straighten rods and tubes of various diameters, and in order that rods of various diameters may pass through the machine between the rotary and stationary belts while maintaining the rotary belt in the same degree of tautness, the cylindrical member 30 is adjustably mounted for horizontal movement. The blocks 31 are slidably mounted in ways on the supports 32, and each block is provided with a horizontally threaded aperture to receive a threaded end portion 75 of an adjusting shaft 76. The shafts 76, which at their forward ends, are mounted in bearing brackets 77 and held therein against axial movement by a pair of collars 78 pinned to the shafts, are connected for simultaneous rotary movement in the same direction by sprockets 80 and a chain 81. One of the shafts 76 is extended and provided with a hand wheel 82, which may be rotated to effect the horizontal movement of the cylindrical member 30. Pointers 85 (Fig. 1), mounted on the bearing blocks 31 and cooperating with the graduations on the stationary scale 86, indicate the proper positions of the cylindrical member 30 for the various diameters of the rods that may be straightened in the apparatus.

The apparatus may be positioned as indicated in Fig. 2, wherein the upper course of the movable belt 25 is inclined from the horizontal or it may be, and preferably is, positioned as indicated in Fig. 3, with the top course of the movable belt 25 in a horizontal position. With the apparatus positioned as indicated in Fig. 3, the rods may be placed on the horizontal portion of the belt and carried forward thereby into engagement with the stationary belt 37, whereupon the rods will be caused to rotate about their own axis and revolve about the drum 10 and pass through the coolant and out of the machine into the receptacle 67, as previously explained. With the apparatus positioned as indicated in Fig. 2, the rods are placed on the inclined portion of the belt 25 and fed one at a time into engagement with the stationary belt 37 by feed mechanism, generally indicated at 90.

The feed mechanism 90 comprises a plurality of fingers 91 fixed at one end to a shaft 92, which is mounted for oscillating movement in a pair of supporting brackets 93 secured to the top plate 15 of the apparatus. The lower end of the fingers 91 are disposed adjacent the upper surface of the belt 25 and are adapted to engage and arrest the downward movement of a row of rods 9 placed on the belt 25 behind the fingers and are adapted to to intermittently raised to permit the movement thereunder of one of the rods. This intermittent oscillating movement of the fingers 91 is accomplished by a lever or arm 95 adjustably secured in a block 96, which, in turn, is angularly adjustably mounted on one end of the shaft 92. The lower end of the arm 95 is engageable with pins 99 axially extending in spaced relation from the end of the drum 10. By properly adjusting the lever 95 axially in the block 96 and angularly with respect to the shaft 92, the fingers 91 may be caused to move upwardly various distances in accordance with the size of the rod being straightened in order to feed one of the rods at a time in spaced relation to each other.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In an apparatus for staightening plastic rods and tubes the combination of means forming a rigid cylindrical straightening surface, a flexible belt having a reentrant portion encircling a portion of said cylindrical straightening surface for forming a flexible straightening surface, means tensioning said belt to cause the portion thereof encircling said cylindrical surface to be urged inwardly toward the cylindrical surface to press a rod positioned between said straightening surfaces against said cylindrical surface, and means for advancing one of said straightening surfaces relative to the other while said belt is urged inwardly toward said cylindrical surface and into engagement with the rod to be straightened to cause the rod to be rolled about said cylindrical surface solely by the advancing of one of said surfaces with respect to the other to cause the rod to be straightened thereby.

2. An apparatus for straightening hot plastic rods and tubes comprising means forming a rigid cylindrical straightening surface, a belt having a reentrant portion encircling a portion of said cylindrical straightening surface and forming a flexible straightening surface, means tensioning said belt to cause the portion thereof encircling said cylindrical surface to be urged inwardly toward the cylindrical surface to press a rod positioned between said straightening surfaces against said cylindrical surface, means for holding one of said straightening surfaces against movement, means for advancing the other of said straightening surfaces to roll said plastic rod between said straightening surfaces to effect the straightening of said rod, and means for cooling said rod during a portion of the rolling movement thereof around said cylindrical surface.

3. An apparatus for straightening flexible rods comprising means having a straight portion and a reentrant portion to form a substantially cylindrical portion, drive means for moving said means forming the substantially cylindrical portion, a stationary flexible belt partially encircling said cylindrical portion and forming therewith a pair of cooperating axially parallel relatively movable surfaces for engaging opposite sides of rods positioned therebetween and rolling them into a straight condition while advancing them from an entrance to an exit point, means for supporting one end of said belt in spaced relation to said cylindrical portion to form an exit for the rods, means for positioning a portion of said belt in spaced relation to the cylindrical portion to form an entrance for said rods, and means tensioning said belt to urge said belt against said cylindrical portion.

4. An apparatus for straightening hot flexible rods comprising means having a straight portion and a reentrant portion to form a substantially cylindrical portion, drive means for moving said means forming the substantially cylindrical portion, a stationary flexible belt encircling a portion of said rotatable cylindrical portion and forming therewith a pair of cooperating axially parallel relatively movable surfaces for engaging opposite sides of rods positioned therebetween and rolling them into a straight condition while advancing them from an entrance point to an exit point, means for supporting one end of said belt in spaced relation to said cylindrical portion to form an exit for the rods, means for positioning a portion of said belt in spaced relation to the cylindrical portion to form an entrance for said rods, means tensioning said belt to urge said belt against said cylindrical portion, and liquid coolant means arranged to engage and cool said rods during a portion of their rolling movement about said cylindrical portion.

5. An apparatus for straightening hot plastic rods and tubes comprising a rotatable drum, an endless belt encircling the major portion of said drum and extending laterally therefrom, means for supporting said endless belt in substantially taut condition, a stationary belt encircling a portion of said drum and said endless belt, means for tensioning said relatively stationary belt to urge the portion thereof encircling said drum and said endless belt inwardly toward said drum, means for rotating said drum to drive said endless belt whereby rods or tubes positioned on the endless belt will be advanced into engagement with the relatively stationary belt and caused to be rolled between the belts and about the drum into a straightened condition, and means for cooling said rods during a portion of their rolling movement about said drum.

6. An apparatus for straightening plastic rods and tubes comprising a rotary drum, an endless belt encircling a substantial portion of said drum and having a portion thereof extending tangentially from said drum to form a supporting surface for rods to be straightened, means for supporting said endless belt in substantially taut condition, drive means for moving said endless belt and rotating said drum, a stationary belt encircling a portion of said drum and said movable belt, stationary means for holding one end of the stationary belt in spaced relation to said drum, means attached to the other end of said relatively stationary belt for tensioning said belt and urging the portion thereof encircling said drum inwardly toward said drum, means for positioning a portion of said relatively stationary belt in diverging relation relative to the movable belt whereby the rods being advanced by said movable belt are fed into engagement with the stationary belt and caused to roll about the axis of said drum in engagement with and between the movable and stationary belts.

7. An apparatus for straightening plastic rods and tubes comprising a cylindrical drum, an endless belt encircling a substantial portion of said drum and having a portion thereof extending tangentially from said drum to form a supporting surface for rods to be straightened, means for supporting said endless belt in substantially taut condition, drive means for advancing said endless belt, a stationary belt encircling a portion of said drum and said movable belt, stationary means for holding one end of the stationary belt in spaced relation to said drum, means attached to the other end of said relatively stationary belt for tensioning said belt and urging the portion thereof encircling said drum inwardly toward said drum, means for positioning a portion of said relatively stationary belt in diverging relation relative to the movable belt whereby the rods being advanced by said movable belt are fed into engagement with the stationary belt and caused to roll about the axis of said drum in engagement with and between the movable and stationary belts, and means including a liquid coolant engageable with the rods during a portion of their rolling movement about the drum to cool said rods.

8. An apparatus for straightening plastic rods and tubes comprising a rotatable drum, an endless belt encircling a major portion of said drum and extending laterally therefrom, means for supporting said endless belt in substantially taut condition, a stationary belt encircling a portion of said drum and endless belt and having a portion disposed in diverging relation to said endless belt, tensioning means connected to the other end of said stationary belt to urge the portion of said belt encircling the drum inwardly toward said drum, means for rotating the drum and advancing the endless belt thereon whereby rods placed on the laterally disposed portion of said movable belt will be fed into engagement with the stationary belt and caused to roll about the drum and between the stationary and movable belts and be straightened thereby, and means for adjusting said stationary member relative to said drum and in parallel relation therewith.

9. An apparatus for straightening plastic rods and tubes comprising a rotatable drum, an endless belt encircling a major portion of said drum and having a portion sloping tangentially upwardly therefrom, means for supporting said endless belt in a substantially taut condition, a stationary belt encircling a portion of said drum and said endless belt and having a portion in diverging relation to said endless belt, means for tensioning said stationary belt to urge the portion of said belt encircling the drum inwardly toward said drum, drive means for rotating the drum and advancing the endless belt, and means operable in response to the rotation of said drum for intermittently feeding rods placed on the sloping portion of the endless belt into engagement with said stationary belt whereby said rods are caused to be rolled about said drum and the stationary member between the stationary and movable belts and to be straightened thereby.

10. An apparatus for straightening plastic rods and tubes comprising a rotatable drum, an endless belt encircling a major portion of said drum and having a portion sloping tangentially upwardly therefrom, means for supporting said endless belt in a substantially taut condition, a stationary belt encircling a portion of said drum and said endless belt and having a portion in diverging relation to said endless belt, means for tensioning said stationary belt to urge the portion of said belt encircling the drum inwardly toward said drum, drive means for rotating the drum and advancing the endless belt, means operable in response to the rotation of said drum for intermittently feeding rods placed on the sloping portion of the endless belt into engagement with said stationary belt whereby said rods are caused to be rolled about said drum and the stationary member between the stationary and movable belts and to be straightened thereby, and means including a liquid coolant engageable with the rods during a portion of its rolling movement around said drum to cool said rods.

11. An apparatus for straightening plastic rods and tubes comprising a rotatable drum, an endless belt encircling a portion of said drum and extending laterally therefrom, a stationary flexible belt yieldably mounted adjacent said drum and in engagement with a portion of said endless belt encircling said drum, and drive means for advancing said endless belt and rotating said drum whereby said plastic rods or tubes positioned on the endless belt will be advanced into engagement with the relatively stationary belt and then rolled between the belts and about a portion of the drum into a straightened condition.

12. An apparatus for straightening plastic rods and tubes comprising a rotatable drum, an endless belt encircling a portion of said drum and extending laterally therefrom, a stationary flexible belt yieldably mounted adjacent said drum and in engagement with a portion of said endless belt encircling said drum, means for advancing said endless belt to cause the plastic rods or tubes positioned on the endless belt to be advanced into engagement with the relatively stationary belt and then to be rolled between the belts and about a portion of the drum into a straightened condition, and means for cooling said rods during a portion of their rolling movement about said drum.

13. An apparatus for straightening plastic rods and tubes comprising a rigid member having a cylindrical surface, an endless belt encircling a portion of said cylindrical surface and extending laterally therefrom, means for maintaining said belt in substantially taut condition, a stationary belt positioned adjacent a portion of said cylindrical surface, means tensioning said stationary belt to urge a portion thereof toward said cylindrical surface and into engagement with the endless belt thereon, and means for advancing said endless belt whereby rods or tubes positioned on the endless belt will be carried into engagement with the relatively stationary belt and be caused to roll between the belts about said cylindrical surface into a straightened condition.

14. An apparatus for straightening plastic rods and tubes comprising a rigid member having a cylindrical surface, an endless belt encircling a portion of said cylindrical surface and extending laterally therefrom, means for maintaining said belt in substantially taut condition, a stationary belt positioned adjacent a portion of said cylindrical surface, means tensioning said stationary belt to urge a portion thereof toward said cylindrical surface and into engagement with the endless belt thereon, means for advancing said endless belt whereby rods or tubes positioned on the endless belt will be carried into engagement with the relatively stationary belt and be caused to roll between the belts about said cylindrical surface into a straightened condition, and means for cooling said rods during a portion of their rolling movement about said cylindrical surface.

15. An apparatus for straightening plastic rods comprising an endless belt for supporting plastic rods thereon, means supporting said endless belt for movement through a predetermined path including a rigid curved member for supporting and guiding said belt through a curved portion of said predetermined path, a stationary belt mounted adjacent the curved portion of said endless belt, means for urging said stationary belt into engagement with the curved portion of said endless belt, and drive means for advancing said endless belt to carry said rods into engagement with said stationary belt and cause the rods to be rolled between said belts and straightened thereby.

16. An apparatus for straightening plastic rods comprising a movable belt for supporting plastic rods thereon, means supporting said movable belt for movement through a predetermined path including a curved member for supporting and guiding said belt through a curved portion of said predetermined path, a stationary belt mounted in engagement with the curved portion of said movable belt, means urging one of said belts toward the other to press against opposite sides of a rod positioned between said belts, and means for advancing said movable belt to carry said rods into engagement with said stationary belt and cause the rods to be rolled therebetween into a straightened condition.

17. In an apparatus for straightening plastic rods the combination of a movable belt for receiving said plastic rods thereon for movement therewith, means guiding said belt for movement through a predetermined path including a curved member for supporting and guiding a portion of said belt through a curved path, a stationary belt mounted in engagement with said movable belt where said movable belt passes through said curved path, means yieldably retaining said stationary belt in engagement with said movable belt for pressing plastic rods positioned between said belts against said movable belt, and means for advancing said movable belt to advance the plastic rods thereon into engagement with said stationary belt and cause them to be rolled between said belts into a straightened condition.

EINER W. LARSEN.
JOHN G. MEYER.

REFERENCES CITED

The following references are of record in the file of this patent:

UNITED STATES PATENTS

| Number | Name | Date |
|---|---|---|
| 601,062 | Neuss | Mar. 22, 1898 |
| 2,011,576 | Gage | Aug. 20, 1935 |
| 2,039,271 | Bierer | Apr. 28, 1936 |
| 2,069,589 | Meijling et al. | Feb. 2, 1937 |
| 2,168,509 | Bennett | Aug. 8, 1939 |
| 2,351,861 | Knowland et al. | June 20, 1944 |
| 2,442,443 | Swallow | June 1, 1948 |